Aug. 20, 1963 W. C. HUEBNER 3,101,024
ALL-PURPOSE PHOTOGRAPHIC MECHANICAL REPRODUCTION CAMERA
Filed Oct. 5, 1959 6 Sheets-Sheet 1

INVENTOR
William C. Huebner
BY
ATTORNEYS

Aug. 20, 1963 W. C. HUEBNER 3,101,024
ALL-PURPOSE PHOTOGRAPHIC MECHANICAL REPRODUCTION CAMERA
Filed Oct. 5, 1959 6 Sheets-Sheet 3

INVENTOR
William C. Huebner
BY
ATTORNEYS

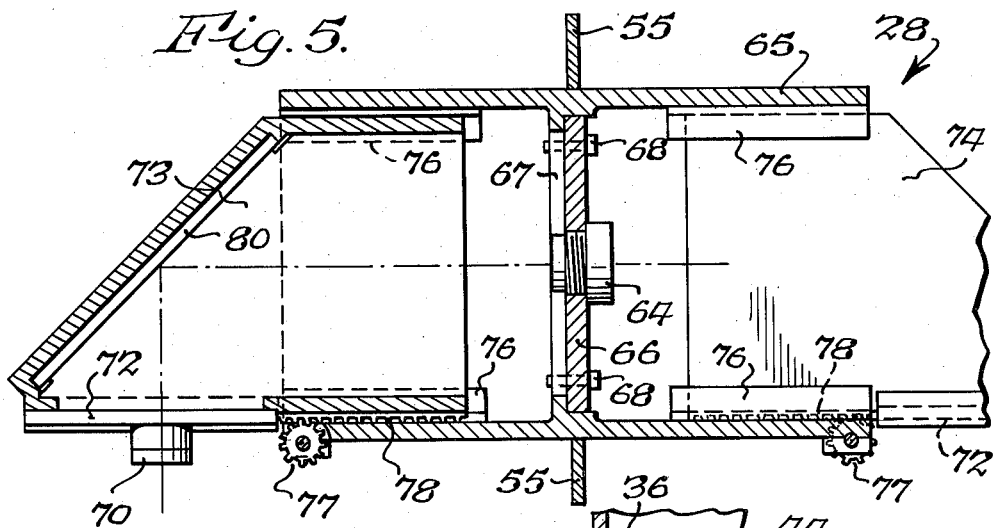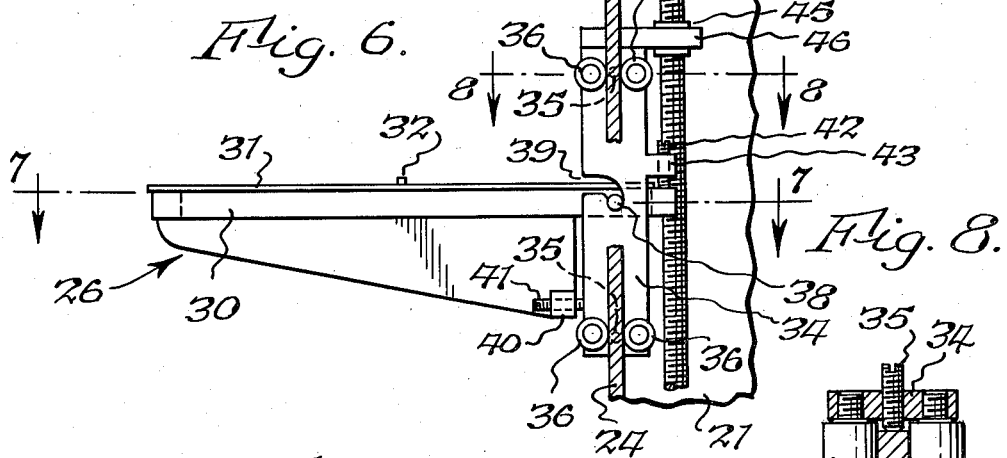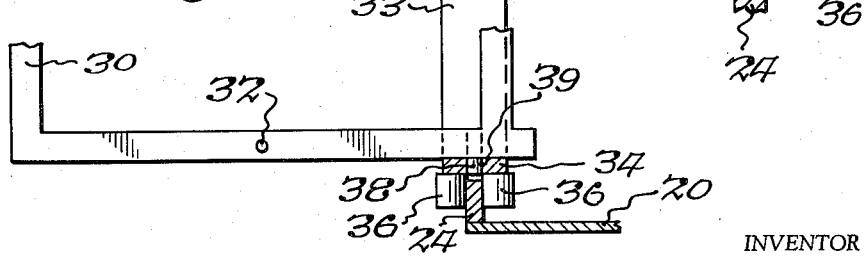

Aug. 20, 1963  W. C. HUEBNER  3,101,024
ALL-PURPOSE PHOTOGRAPHIC MECHANICAL REPRODUCTION CAMERA
Filed Oct. 5, 1959  6 Sheets-Sheet 5
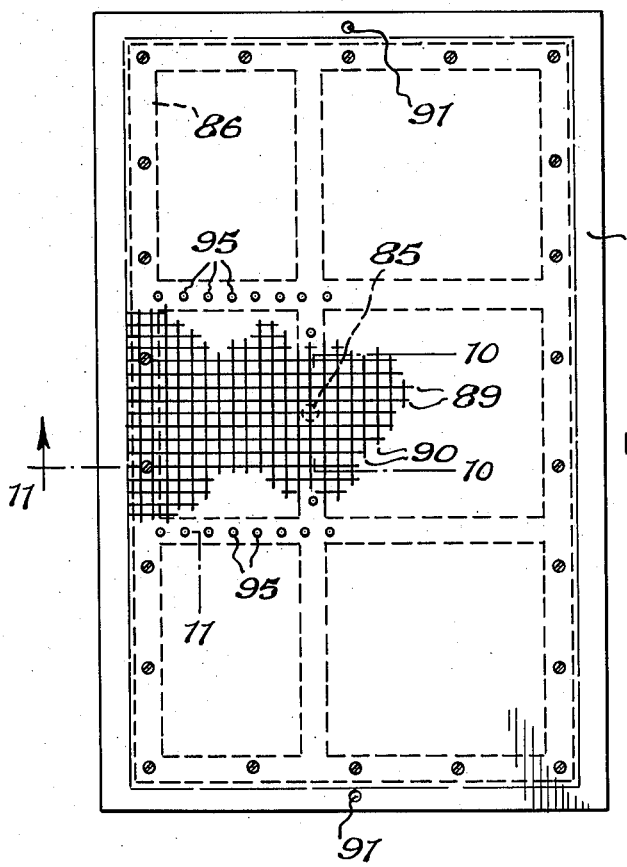
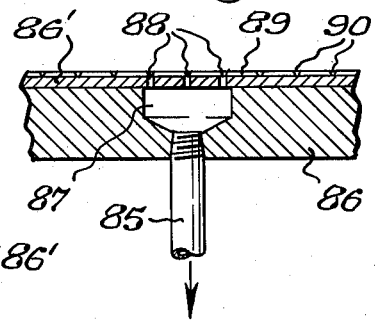
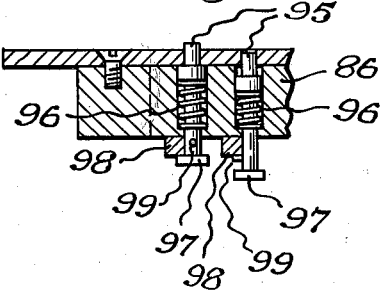
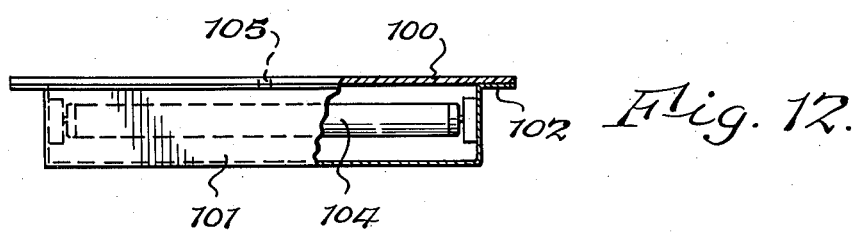
INVENTOR
William C. Huebner
BY
ATTORNEYS

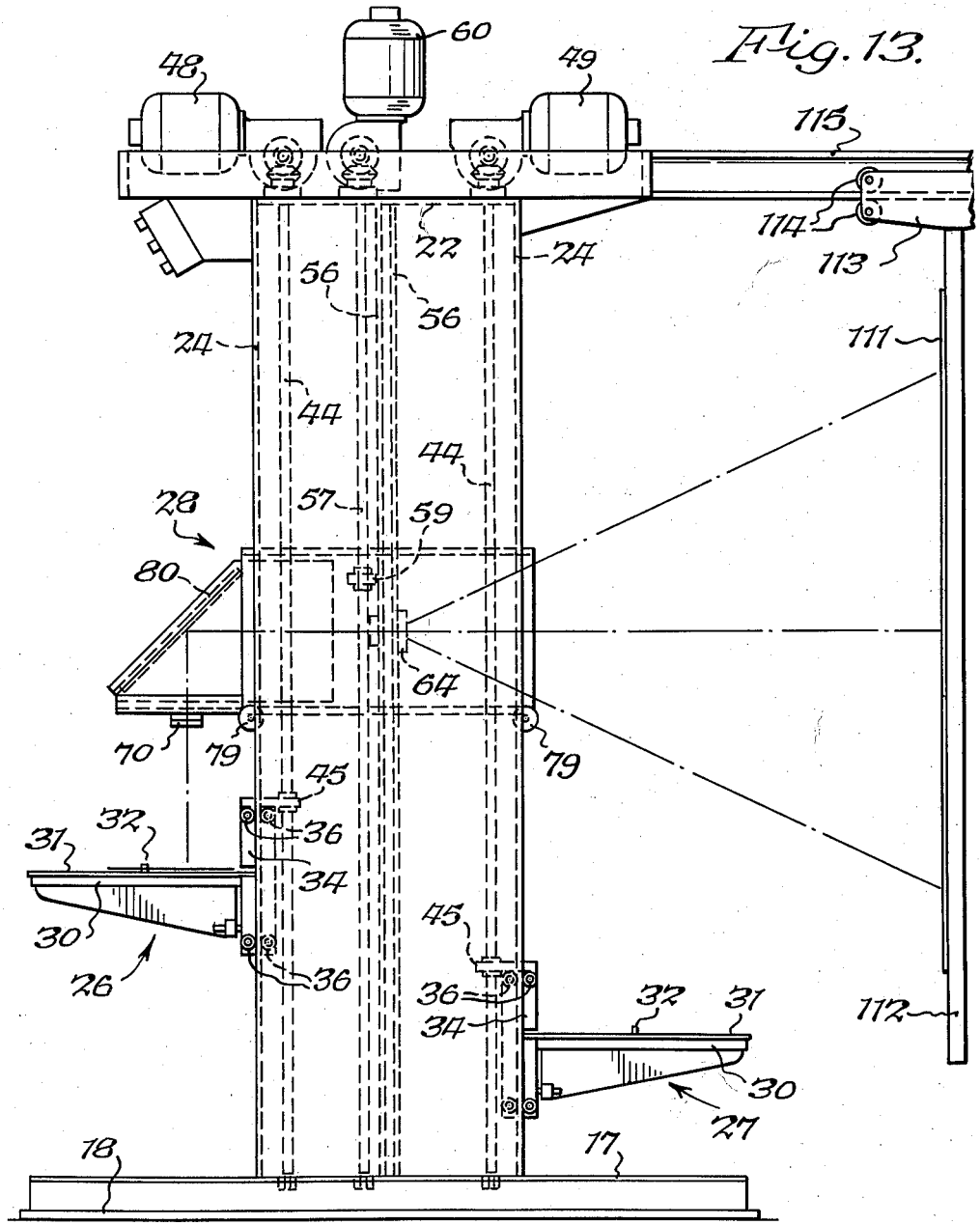

United States Patent Office 3,101,024
Patented Aug. 20, 1963

3,101,024
ALL-PURPOSE PHOTOGRAPHIC MECHANICAL
REPRODUCTION CAMERA
William C. Huebner, Mamaroneck, N.Y., assignor to Lanston Industries, Incorporated, Philadelphia, Pa., a corporation of Virginia
Filed Oct. 5, 1959, Ser. No. 844,514
10 Claims. (Cl. 88—24)

This invention relates to vertical cameras of the type commonly referred to as compositor cameras, and particularly to cameras of the type used mainly in connection with the graphic arts.

Vertical cameras of this type as heretofore constructed were inconvenient in that they were of such height that the operator had to climb a ladder to insert a plate or film.

It is consequently an object of this invention to produce a camera having all of the advantages of a vertical camera but in which both the copy and film holders are located so as to be readily accessible to persons standing on the floor which supports the camera. It is also an object to provide a camera in which the light rays from the objects are reflected so as to pass in a horizontal direction for a part of the distance from the copyholder to the film holder. A further object is to provide a camera in which the copyholder and film holder are horizontal during all adjustments of parts of the camera.

Figure 1:
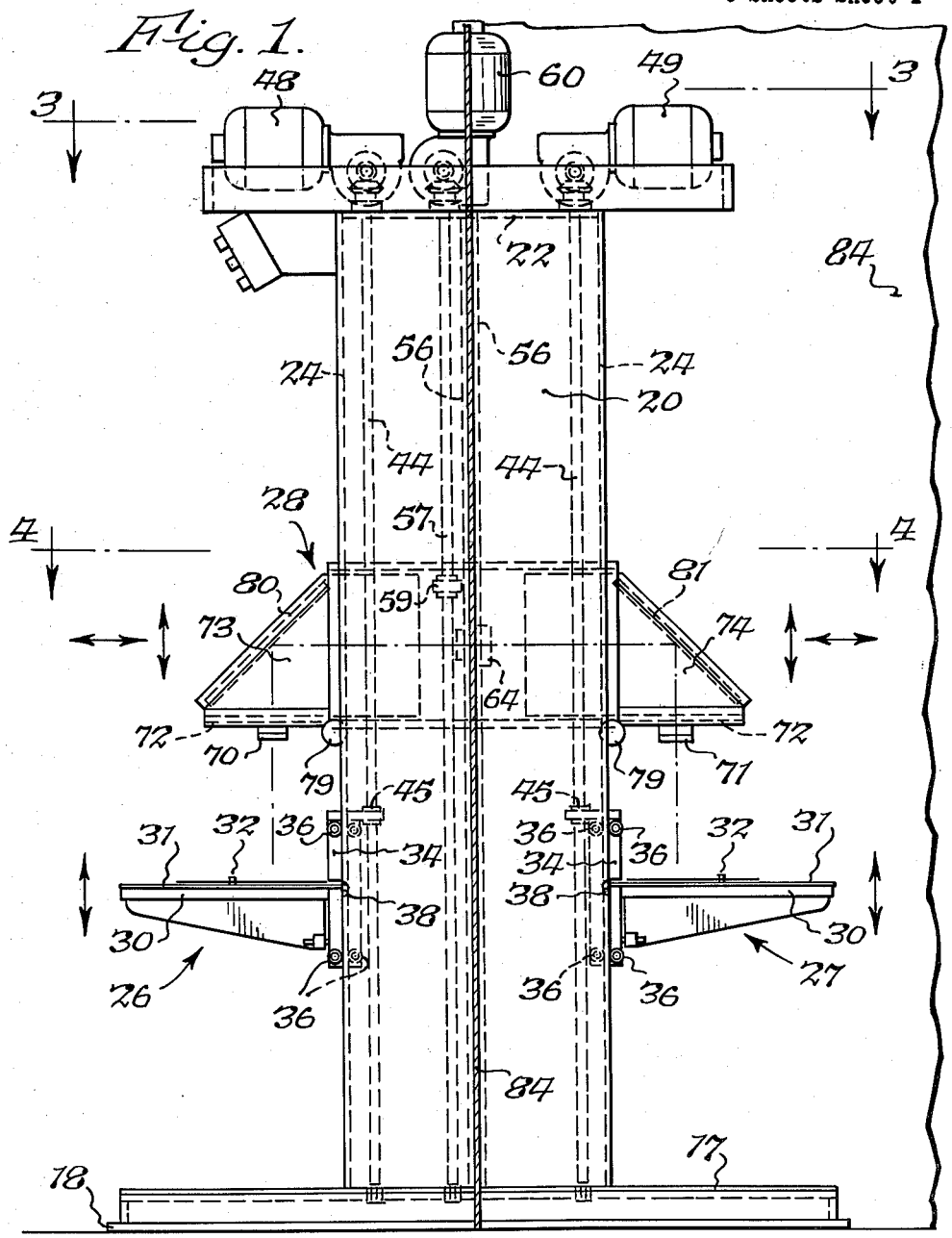
FIG. 1 is a front elevation of a camera embodying this invention.
Figure 3:
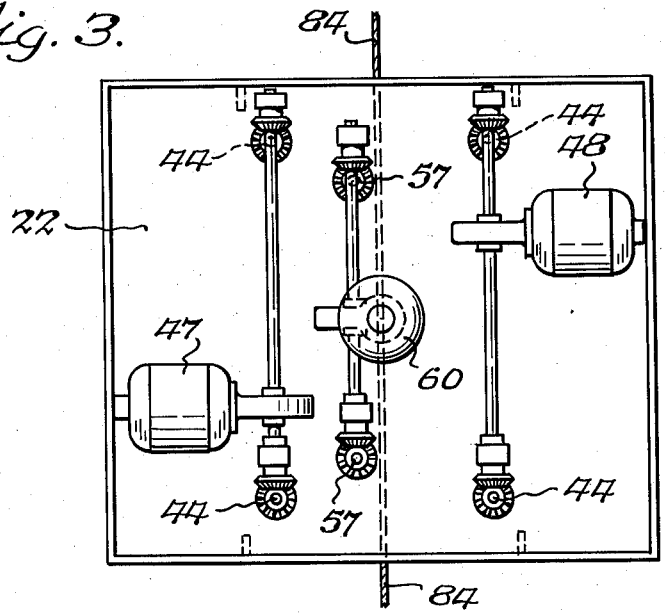
Figure 4:
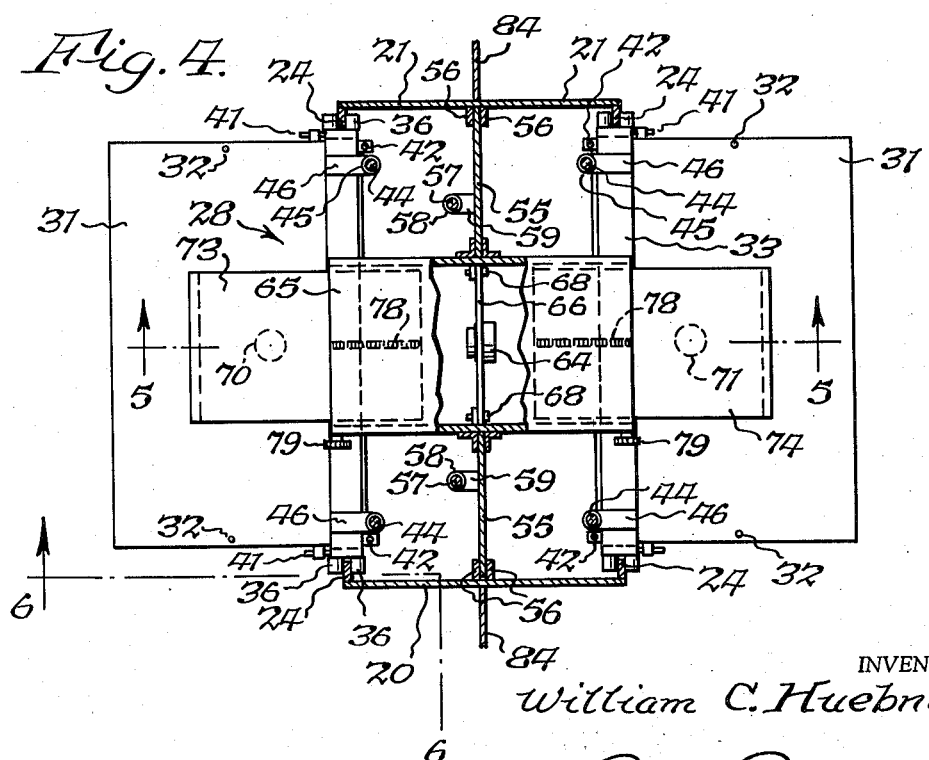

FIGS. 3 and 4 are sectional plan views thereof on lines 3—3 and 4—4, FIG. 1.

FIGS. 5 and 6 are vertical, fragmentary views thereof on an enlarged scale respectively on lines 5—5 and 6—6, FIG. 4

FIG. 7 is a fragmentary top plan view of the part of the camera shown in FIG. 6, as seen on section line 7—7, FIG. 6.

FIG. 8 is a fragmentary sectional view thereof on line 8—8, FIG. 6.

FIG. 9 is a top plan view of a copyholder provided with suction passages for holding work flatly thereon.

FIGS. 10 and 11 are fragmentary sectional elevations thereof on an enlarged scale respectively on lines 10—10 and 11—11, FIG. 9.

FIG. 12 is an elevation, partly in section, of a light plate which may be used for illuminating transparencies.

FIG. 13 is an elevation showing diagrammatically how the camera may be used for projecting images of copy on a larger scale.

My improved camera, one embodiment of which is illustrated in the drawings, includes an upright supporting frame for the various parts of the camera. This supporting frame may be of any suitable or desired construction and is mounted on a base 17 which is preferably supported by a cushioning member or pad 18. The frame, for example, may include upright, front and rear plates 20 and 21 secured at their lower ends to the base 17 and extending to a top plate 22 of the frame. The plates 20 and 21 are reinforced by means of rails or bars 24 secured thereto and also forming guide tracks for some of the vertically movable parts of the camera.

My improved camera includes a copy or object holder or table 26 mounted on one side of the frame, a film holder or table 27 at the other side thereof, and a lens holder or carrier 28 mounted in the middle portion thereof and above the two holders 26 and 27 and having laterally projecting parts extending over these two holders.

The two holders 26 and 27 may be of any suitable construction. Those shown comprise rectangular frames 30 formed to receive the table tops 31, the edges of which rest on the frames. These frames preferably have upstanding pins or studs 32 which locate different table tops 31 in correct relation to the supporting frames 30. These supporting frames are removably mounted on carriages movable vertically on the frame of the camera. The carriages may each be formed of bands or strips 33 of metal bent into rectangular form, the opposite sides of which form upright plates 34, see FIGS. 6–8. The carriages have pairs of rollers 36 mounted thereon in such relation to each other that the rollers of each pair engage at opposite faces of the guide tracks or bars 24. By providing a pair of rollers at each end of the upright plate 33 of each carriage, the carriages will travel up or down on the guide tracks with a high degree of accuracy and without moving the table tops 31 out of horizontal positions. Adjustable screws 35 eliminate end play between plates 34 and the rails 24.

The two supporting frames 30 are removably mounted on the carriages 33, for example, by providing the frames with laterally and outwardly extending studs 38 formed to enter into angle shaped slots 39 formed in the carriage plates 34. The lower ends of these slots are preferably upright so that the studs cannot be removed from the slots by outward pull. The lower portions of the side members of the table-supporting frames 30 have lugs 40 which are threaded to receive threaded adjusting screws 41 engaging the adjacent edge of the carriage plates so that the tables or holders 26 and 27 can be adjusted into horizontal positions. If desired, stop screws 42 may be provided which have threaded engagement with lugs 43 extending from the inner edges of the carriage plates, the lower ends of the screws engaging with parts of the supporting frames 30. This prevents accidental dislodging of the table since in order to remove the table-supporting frame 30, it is first necessary to swing the outer end of the same upwardly, whereupon the studs 38 may be moved upwardly then out of the slots 39.

The carriages 33 supporting the tables or holders 26 and 27 may be moved up and down by suitable mechanisms including upright screw shafts 44 having their upper and lower ends journalled respectively in the top plate 22 and base 17 of the frame of the camera. The screw shafts 44 have threaded engagements with nuts 45 secured to arms 46 mounted on the carriages 33. The upper ends of these screw shafts 44 are connected through suitable speed reducing mechanisms and gearing (see FIG. 3) with motors 48 and 49 controlling the movements of the holders 26 and 27 respectively. The motors may be controlled in any usual manner, for example, by means of controls actuated by groups of push buttons 50 and 51 which control up and down motion as well as stopping the movement of the holders. Any other means for controlling the movements of the holders 26 and 27 may be employed.

Figure 2:
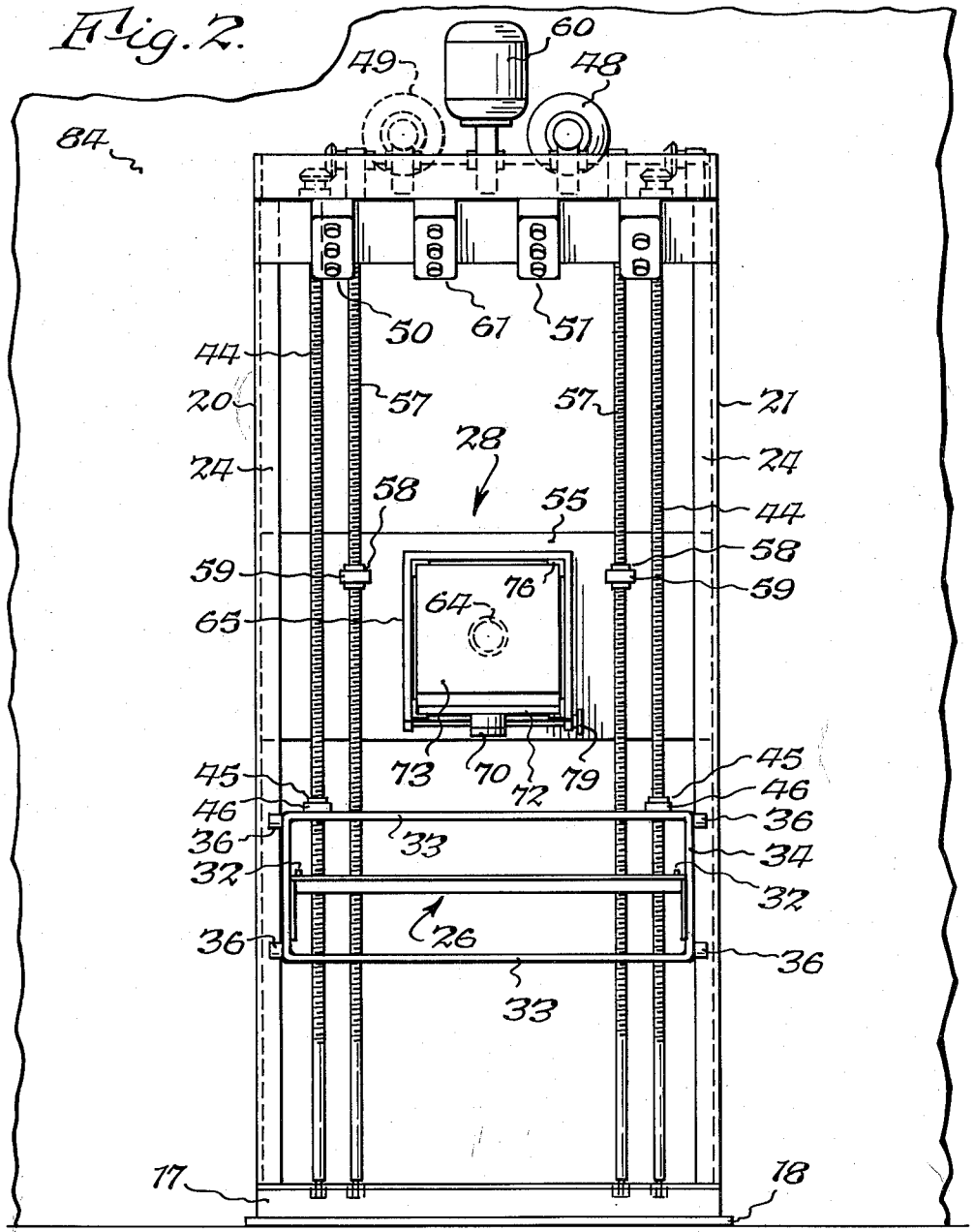
FIG. 2 is a side view thereof.

The lens holder or carrier 28 includes an upright plate 55 which is also movable vertically on the frame of the camera. The front and rear edges of this plate are mounted between a pair of guide rails or bars 56 which are secured to the front and rear frame plates 20 and 21, and in addition to forming guides between which the edges of the plates 55 of the lens carrier may move vertically, these bars 56 also serve to reinforce the frame plates 20 and 21. This plane is moved vertically by means of a pair of screw shafts 57 which engage in nuts 58, FIGS. 2 and 4, secured in lugs or brackets 59 mounted on the plate 55. These screw shafts 57 are also journalled in their upper and lower ends respectively in the upper plate 22 and the base 17 and are driven through suitable gearing by means of a motor 60, also mounted on the top plate 22. The control of this motor may be effected in the same manner as the controls of motors 48 and 49 by means of switch buttons mounted on a control panel 61, FIG. 2. The group of switch buttons 61 may be identical with the group of buttons 50 and 51 to enable the lens carrier to be moved up and down or stopped, and all of these switch buttons are readily accessible to a person operating the camera.

The lens system supported on the lens holder may be of any suitable or desired type as required for the work which the camera is to perform. This lens system includes a central lens 64 mounted in a suitable housing 65 which extends to opposite sides of the upright supporting plate 55. This housing is rectangular in cross section and is operated at its opposite ends. The lens 64 is preferably removably mounted on a plate 66 which is in turn removably secured within the housing 65, for example to inwardly extending flanges or supports 67 by means of screws 68 or the like so that the lens 64 can be easily changed or removed as required. Other lenses 70 and 71 are also mounted on the lens carrier. The optical axes of these lenses are vertical, the lens 70 being directed toward the copyholder 26 and the lens 71 being directed toward the film holder 27. Both of these lenses are mounted on readily removable lens boards or bottom plates 72 of adjustable lens housing parts 73 and 74 which are mounted to telescope into the opposite open ends of the housing 65. These adjustable lens housing parts may be adjusted manually to move them over different portions of the copyholder and film holder. This adjustment may be accomplished by means of a gear 77 and a rack 78, the gear 77 being pivoted on one of the walls of the main body portion 65 by the lens holder and the rack being secured on the lower wall of the adjustable lens housing. The gears 77 are mounted on shafts and may be adjusted manually by means of adjusting knobs 79 on the ends of these shafts, and guide tracks 76 are secured within the lens housing 65 to cooperate with portions of the telescoping housing parts 73 and 74 and facilitate the correct movement of these parts 73 and 74 into and out of this housing.

The adjustable housing parts 73 and 74 of the lens carrier are provided with reflectors 80 and 81 respectively arranged at 45 degrees to the axis of the lenses 70 and 71. The lenses 70 and 71 may also be of any suitable types usable in connection with the various purposes for which my improved camera may be used and are preferably mounted on lens boards 72 removably received in any suitable manner across openings formed in the bottoms of the housing parts 73 and 74.

It will be obvious that if a copy or other object is to be placed on the copyholder 26, it will be illuminated by any suitable or usual lighting devices, such for example, as those present used in cameras of this type and it is therefore deemed unnecessary to show such lighting means. Light from this copy or object will pass upwardly to the reflector 80 by means of which it is reflected in a horizontal direction to the other reflector 81 and then down to a light sensitive film or other article mounted on the film holder. One or more of the lenses 70, 64 or 71 may be interposed into the path of light from the copyholder to the film holder. The broken lines in FIG. 1 indicate the optical axis of the light passing through the camera. Light may of course be passed in the reverse direction from the film holder 27 to the other holder 26.

In FIG. 1, lens 64 is shown occupying a center position between reflectors 80 and 81. If lenses 70 and 71 are not used and a copy is placed on table 32, it is reflected by reflector 80 through lens 64 and the projected image is then reflected by reflector 81 to the sensitized film on the holder 27, whereupon the copy and the film image are approximately the same size if two holders are at the same elevation. Variations in size may be obtained by adjustment of the holders relatively to each other.

If an enlargement is required, the lens 64 is removed and a lens 70 is employed, whereupon the image is projected by lens 70 to reflector 80 and then to reflector 81 and to film surface as an enlarged image. The focus setting of the image is determined by the size and shape of the focal lens 70. If a small focus lens is used, then the projected image is greatly enlarged and can be twenty-five times larger than the copy. If the copy is to be reduced, the lens board carrying the lens 71 is placed in position and the camera is used without lenses 70 and 64, whereupon a greatly reduced image is obtained. This function is particularly useful in making microfilm reduction from a large copy of microfilm size. The reduction may be varied by the relative vertical adjustment of the holders 26 and 27. For example, for enlarging, the lens carrier should be at or near its upper position and the copy holder near the lens carrier and the film holder in a lowered position and an opposite arrangement of the holders is employed for reduction. When a lens board is removed the entire lower face of the adjustable housing parts 73 or 74 is open to the passage of light.

If the light from the copy is to pass to a sensitized film or plate on the film holder, it will be necessary to shield the sensitized surface from light other than that passing through the camera. For this purpose any suitable cabinet or opaque curtain 84 may be provided which is secured to the front and back plates 20 and 21 of the camera and may extend around and enclose the film holder side of the camera or a part thereof. Since it is obvious that the opaque screen may be of any suitable type, it is not herein shown in full.

Any desired type of table top can be employed on the copyholder 26 and film holder 27. In FIG. 9 I have illustrated by way of example a table top having vacuum channels formed in the upper surface thereof which serve to hold a copy flatly on the upper surface of this table top. For example, a table top 86 may have a cavity or space 87 therein terminating at its lower end in a tube 85 connected with any suitable air pump (not shown) to remove air from the space 86. On the table top is placed a plate 86' having a plurality of small openings 88 terminating at their lower ends in the cavity 87 and at their upper ends in shallow channels 89 and 90 extending both lengthwise and crosswise of the upper surface of the plate. By means of this construction the sheet or film will be readily held in flat position on the table top by means of the suction transmitted through the openings 88 to the channels 89 and 90. It will be understood of course that if the sheet to be held is of smaller dimensions than the table top itself, then the channels which are not covered by the copy or film must be covered by other sheets. This table is formed to fit into the frame 30 of either of the holders 26 or 27. The edge portions of this plate are provided with holes 91 accurately positioned to cooperate with the pins or studs 32 of the frame 30.

It is frequently necessary to support films or sheets of material provided with accurately placed apertures at the sides thereof in accurate relation to a table top. In order to position such films accurately on either of the two holders 26 and 27, the table top may be provided with a series of upwardly projecting holding pins 95 which are arranged so that one or another set of these pins may be moved above the table top into position to cooperate with a film of this type. Any suitable number of these pins 95 may be provided to cooperate with films of different manufacture, and they are arranged so that only those pins which are desired for positioning and holding the film will project above the upper surface of the table top, the remaining pins being held below this surface. In FIG. 11 I have shown by way of example holding and positioning pins 95 which extend through the table top and are urged upwardly by means of springs 96. The holding pins 95 adjacent to their lower ends are provided with knobs or handles 97 for withdrawing and turning the pins, and stops 98 are provided which may cooperate with transversely extending projections or pegs 99 on the pins 95. For example, when it is desired to have a pin 95 extend above the table top, the pin 95 is turned so that its projection 99 is moved out of engagement with the stop 98, whereupon it will be urged into its upper position by its spring 96. When a pin 95 is not to project above the table top, it is drawn downwardly by means of the handle or knob 97 and turned so that the transversely extending projection will bear on the stop 98, thus holding the pin 95 downwardly below the table top. Any other means for positioning these holding pins for films may be provided.

It is also desirable at times to provide a table top with an illuminated surface so that, for example, a transparency may be projected upwardly from the copyholder 26. Any suitable construction may be provided for this purpose. As shown in FIG. 12, this table top has a light-transmitting plate 100 resting on the upper edges of a light box 101 which has outwardly extending flanges 102 formed to rest upon the table supporting frame 31. This table has a series of light sources such as tubes 104, which are suitably arranged in the light box and connected with a source of electric power. This table top, it will be noted, is also provided with apertures 105 which will fit over the studs 32 to correctly locate this table top on the copy or film holder, as may be desired.

It will be obvious that this camera may be employed for many purposes and is very adaptable for enlarging or reducing the size of images. For maximum variation in size, the copyholder and film holder will be moved to their lowest positions and the lens holder to its uppermost position. In addition to photographing objects or copies on the holder 26, it is also possible to mount on the copyholder a microfilm in a microfilm holder directed upwardly. These holders are common and purchasable on the open market and are therefore not shown in these drawings. The light from the microfilm will consequently be projected upwardly and reflected by either or both reflectors 80 or 81 to the film holder to produce the desired enlargement.

The camera described may be provided with many different attachments heretofore used in vertical or horizontal cameras. It is possible, for example, to project a greatly enlarged image on an upright surface or screen, as shown in FIG. 13, in which the camera may be identical with the one shown in the other views. In this case the adjustable lens housing part 74 is entirely removed from the camera so that light from the reflector 80, after passing through the lens 64, will pass directly out of the open end of the lens carrier 65 to a screen or a sensitized film 111 suitably mounted in any desired manner on a panel 112. This panel may be adjustable toward and from the body portion of the camera, for example, by mounting the same on a carriage 113 having wheels or rollers 114 on which the carriage is movable lengthwise of a rail or track 115. This rail may be mounted on the frame of the camera. Consequently the panel 112 may be moved toward and from the lens 64, thus varying the size of the enlargement projected thereon.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A camera including an upright frame having a middle portion, a copyholder and a film holder mounted on the opposite sides of said frame, a lens carrier mounted on said middle portion of said frame and having parts extending over said holders, means on said lens carrier for conducting light in horizontal and vertical direction from one holder to another, means for guiding said holders for movement toward and from said lens carrier and including guide tracks mounted on said frame, a carriage mounted on said frame and guided for vertical movement on said track, and cooperating parts on at least one of said holders and said carriage for removably mounting said one holder on said frame.

2. A camera including an upright frame, a copyholder and a film holder mounted on the opposite sides of said frame, a lens carrier mounted on the middle portion of said frame and having parts extending over said holders, means on said lens carrier for conducting light in horizontal and vertical direction from one holder to another, a forwardly and rearwardly extending plate on which said lens carrier is mounted, guide tracks mounted at the front and rear portions of said frame and with which the opposite ends of said plate engage for holding said plate in vertical position, and means for moving said plate and the lens carrier mounted thereon vertically relatively to said frame.

3. A camera including an upright frame and a carriage supported on said frame, a copyholder and a film holder mounted on the opposite sides of said frame, and a lens and reflector carrier mounted on said carriage above said holders to reflect an image from one of said holders to the other, and means for adjusting said holders vertically relatively to said lens and reflector carrier while said holders remain in horizontal positions, said carrier including a rectangular housing open at its ends, parts on opposite ends of said housing and telescopically arranged in said ends to extend over different portions of said holders, and reflectors in said parts arranged at 45 degrees from said holders for reflecting light from a holder horizontally through said housing.

4. A camera according to claim 3 and including a lens in said housing and having a horizontal optical axis through which light passes from one reflector to the other.

5. A camera according to claim 3 wherein an image is reflected vertically between each associated holder and reflector and horizontally between reflectors, and including a lens in said housing and having a horizontal optical axis through which light passes from one reflector to the other, said telescopically arranged parts having retainers for supporting the holders for lenses in the bottoms thereof respectively facing said copy and film holders and which are arranged with their optical axes vertical.

6. A camera including an upright frame, a copyholder and a film holder each adjustably mounted in horizontal positions on opposite sides of said frame, reflecting means for reflecting light horizontally from one of said holders to the other, said holders each comprising a frame, and removable table tops formed to seat within said frames, and cooperating parts on said frames and said table tops for adjustably positioning said table tops in said frame whereby to correctly align said copy holder and film holder with respect to the reflecting means.

7. A camera according to claim 6 in which said table top includes a transparent plate, and illuminating means below said plate to illuminate a transparency placed on said plate.

8. A camera including an upright frame, a copyholder and a film holder mounted on opposite sides of said frame and each adjustable vertically thereon, and arranged in horizontal positions, and a lens and reflector carrier movable vertically relatively to said copyholder and film holder to project an image from one of said holders to the other, and an opaque screen enclosing said film holder for excluding from the film light other than that passing through said camera lens.

9. A camera including an upright frame, a copy holder and a film holder mounted in horizontal position on opposite sides of said frame, a lens and reflector carrier supported by said frame and including a first part extending over said copy holder and a second part extending over said film holder, said second part having an opening formed therein, first and second reflectors for the respective first and second parts, each reflector being arranged at 45 degrees from the holder thereunder, said second reflector being removably carried by said second part so as to close said opening, a lens having a horizontal optical axis arranged between said reflectors in operative relation thereto, means for guiding said film holder and said copy holder for movement toward and away from said carrier and including guide tracks mounted on said frame, a carriage mounted on said frame and guided for vertical movement on said track, cooperating parts on at least one of the said holders and said carriage for removably mounting said one holder on said frame, and a member carried by said frame on the side thereof associated with said film holder, said member having an upright surface positioned with respect to said lens so that said optical axis is substantially normal to said surface; the construction and arrangement being such that an image on said copy holder is directed in vertical and horizontal directions from said copy holder to said film holder when said second reflector is in position, and from said copy holder to said upright surface when said second reflector is removed from said opening.

10. A camera comprising a support, a copy holder having a horizontal copy receiving surface, a first reflector disposed above said copy holder and having a reflector surface extending at an angle of 45 degrees with respect to said copy receiving surface so as to reflect in a horizontal direction an image of copy disposed on said copy receiving surface, a lens disposed with its axis horizontally so as to receive the reflected image and transmit the same horizontally, a second reflector having a reflector surface disposed at an angle of 45 degrees with respect to the axis of said lens so as to reflect the transmitted image vertically downwardly, a film holder disposed below said second reflector and having a film receiving surface extending horizontally in a position to receive the image reflected downwardly by said second reflector surface, means mounting said lens, said reflectors and said holders on said support for relative vertical translational movement between said copy holder and said first reflector toward and away from each other and independent relative vertical translational movement between said film holder and said second reflector toward and away from each other while maintaining said reflector surfaces in a position of horizontal optical alignment with respect to said lens so as to control the size and focus of an image on a film disposed on the film receiving surface of said film holder which is reflected and transmitted from copy disposed on the copy receiving surface of said copy holder by said reflectors and said lens.

References Cited in the file of this patent

UNITED STATES PATENTS

| | | |
|---|---|---|
| 1,802,193 | Caps | Apr. 21, 1931 |
| 2,369,897 | Hjort | Feb. 20, 1945 |
| 2,431,612 | Furnas | Nov. 25, 1947 |
| 2,519,610 | Sussin | Aug. 22, 1950 |
| 2,552,990 | McKay | May 15, 1951 |
| 2,645,153 | Halpern | July 14, 1953 |
| 2,673,487 | Bumstead | Mar. 30, 1954 |
| 2,718,814 | Baston | Sept. 27, 1955 |
| 2,930,284 | Limberger | Mar. 29, 1960 |

FOREIGN PATENTS

| | | |
|---|---|---|
| 981,433 | France | Jan. 17, 1951 |